United States Patent
Hamlin et al.

(10) Patent No.: US 11,341,075 B2
(45) Date of Patent: May 24, 2022

(54) METHOD FOR SELECTIVELY CONNECTING TO A SMART PERIPHERAL AND SYSTEM THEREFOR

(71) Applicant: DELL PRODUCTS, LP, Round Rock, TX (US)

(72) Inventors: Daniel L. Hamlin, Round Rock, TX (US); Manuel Novoa, Leander, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/991,844

(22) Filed: Aug. 12, 2020

(65) Prior Publication Data

US 2022/0050801 A1     Feb. 17, 2022

(51) Int. Cl.
  *G06F 13/10*     (2006.01)
  *G06F 13/40*     (2006.01)
  *H04W 76/10*     (2018.01)

(52) U.S. Cl.
  CPC ........ *G06F 13/4068* (2013.01); *H04W 76/10* (2018.02)

(58) Field of Classification Search
  CPC .......................... G06F 13/4068; H04W 76/10
  See application file for complete search history.

(56) References Cited

U.S. PATENT DOCUMENTS

| | | | | |
|---|---|---|---|---|
| 7,590,075 B2* | 9/2009 | Pirzada | ................ | H04W 88/00 370/254 |
| 8,462,734 B2* | 6/2013 | Laine | ................ | H04M 1/72412 370/252 |
| 8,472,874 B2* | 6/2013 | Tang | .................... | H04W 12/50 370/313 |
| 8,554,970 B2* | 10/2013 | Suumaki | ................ | H04W 4/08 710/303 |
| 9,131,335 B2* | 9/2015 | Huttunen | ................ | H04B 7/26 |
| 9,152,527 B2* | 10/2015 | Huang | .................. | G06F 1/1632 |
| 9,426,184 B2* | 8/2016 | Huang | ................. | H04L 65/1069 |
| 9,436,643 B2* | 9/2016 | Dees | ........................ | G06F 1/1632 |
| 9,462,617 B2* | 10/2016 | Glik | ......................... | H04W 4/21 |
| 9,497,787 B2* | 11/2016 | Mostafa | ................ | G06F 1/1632 |
| 9,521,697 B2* | 12/2016 | Verma | .................... | H04W 76/23 |
| 9,544,048 B2* | 1/2017 | Raveendran | .......... | G06F 1/1632 |
| 9,634,757 B2* | 4/2017 | Huang | .................... | H04B 7/26 |
| 9,727,517 B2* | 8/2017 | Engelen | ................. | H04L 63/105 |
| 9,811,116 B2* | 11/2017 | Huang | .................. | G06F 1/1632 |
| 9,942,379 B2* | 4/2018 | Huang | .............. | H04M 1/72412 |
| 10,063,751 B2* | 8/2018 | Hamsici | ................ | G06F 16/532 |
| 10,088,869 B2* | 10/2018 | Dees | ........................ | G06F 1/1632 |
| 10,200,523 B2* | 2/2019 | Dees | .................... | H04L 12/2814 |

(Continued)

*Primary Examiner* — Cheng Yuan Tseng
(74) *Attorney, Agent, or Firm* — Larson Newman, LLP

(57) ABSTRACT

A method may include a software service executing at an information handling system to determine desired capabilities of a docking station. The software service receives information from available docking stations via a wireless communication interface, the information identifying actual capabilities of each docking station. The method further includes coupling the information handling system to a selected docking station in response to determining at the information handling system that the actual capabilities of the selected docking station provide the desired capabilities.

20 Claims, 7 Drawing Sheets

(56) References Cited

U.S. PATENT DOCUMENTS

| | | | |
|---|---|---|---|
| 10,271,359 B2* | 4/2019 | Bernsen | H04W 76/10 |
| 10,628,105 B2 | 4/2020 | Behzadi et al. | |
| 10,757,561 B2* | 8/2020 | Reshef | H04W 8/005 |
| 2014/0036767 A1* | 2/2014 | Perugupalli | H04W 4/80 |
| | | | 370/328 |
| 2016/0182291 A1* | 6/2016 | Verma | H04B 7/26 |
| | | | 709/221 |
| 2016/0309420 A1* | 10/2016 | Verma | H04W 52/243 |

* cited by examiner

METHOD FOR SELECTIVELY CONNECTING TO A SMART PERIPHERAL AND SYSTEM THEREFOR

FIELD OF THE DISCLOSURE

This disclosure generally relates to information handling systems, and more particularly relates to selectively connecting to a smart peripheral.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include a software service executing at an information handling system to determine desired capabilities of a docking station. The software service receives information from available docking stations via a wireless communication interface, the information identifying actual capabilities of each docking station. The method further includes coupling the information handling system to a selected docking station in response to determining at the information handling system that the actual capabilities of the selected docking station provide the desired capabilities.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
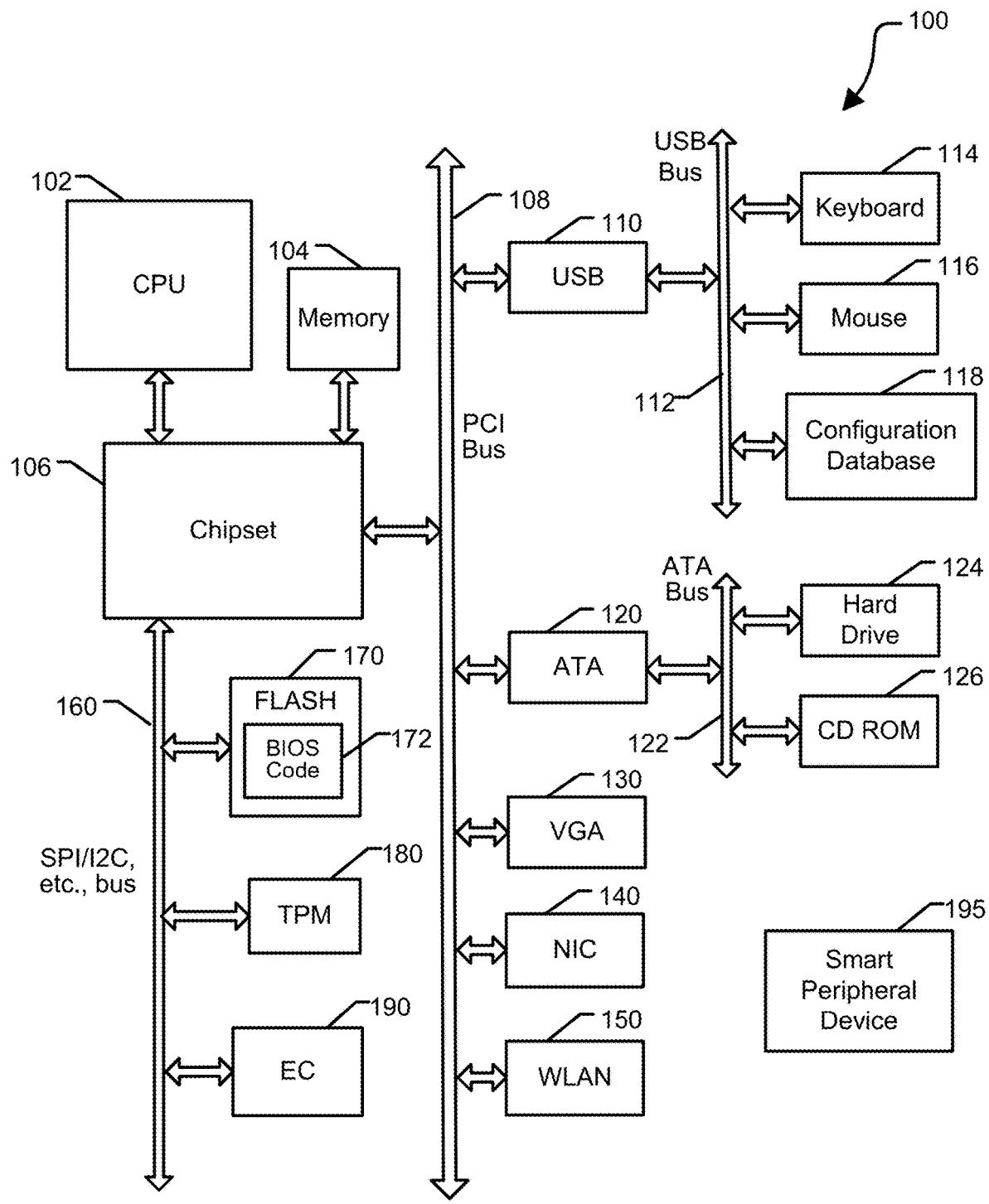
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial buses 160, a non-volatile rand access memory (NVRAM) 170 for storing a basic input/output system (BIOS) 172, a trusted platform module (TPM) 180, an embedded controller (EC) 190, and a smart peripheral device 195.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. After the initialization procedure is complete and an operating system, such as Windows, is loaded, computational operation of information handling system can begin. BIOS 172 can be substantially compliant with one or more revisions of the UEFI specification. The UEFI specification provides standard interfaces and interoperability guidelines for devices that together make up an information handling system. The UEFI specification allows for the extension of platform firmware by loading UEFI driver and UEFI application images. For example, an original equipment manufacturer can include customized or proprietary images to provide enhanced control and management of the information handling system 100.

In an embodiment, smart peripheral device 195 can include a docking station, a printer, a storage device, and network interface device, and the like. As disclosed herein, a smart peripheral device includes a microcontroller and typically further includes a wireless communications interface to allow the device to communicate with a host device, such as information handling system 100. When information handling system 100 is connected to smart peripheral device 195, system 100 can utilize the functionality of device 195 as if the device is a component of system 100. For purposes of example, smart peripheral device 195 is described below in the context of docking station; however one of skill will appreciate that the disclosed techniques are applicable to any smart peripheral device. A docking station provides a simplified way of connecting an information handling system, such as a laptop computer, to common peripherals, such as a network communication interface, a display device, a keyboard, a mouse, a data storage device, a wireless power mat, and the like. For example, a docking station can allow some laptop computers to substitute for a desktop computer, without sacrificing the mobile computing functionality of the device.

In the past, a docking station usually consisted of a proprietary device engineered to mechanically and electrically couple to a specific model of laptop device. Today, a docking station may interface wirelessly with an information handling system using one or more wireless communication protocols, such as Wi-Fi, Wi-Fi Direct, Bluetooth, and the like. Accordingly, a wireless docking station can now be provided for use as a shared resource. For example, in a work environment a wireless docking station can be provided in a conference room or a shared work area. Moreover, wireless docking stations may be provided for use by the general public, such as in hotels, airports, coffee shops, and the like. In an embodiment, information handling system 100 may detect multiple wireless docking stations that are within range to connect. Techniques disclosed herein provide means for automatically determining whether functional capabilities of available docking stations, or another type of smart peripheral device, satisfy the needs of information handling system.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more buses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Figure 2:
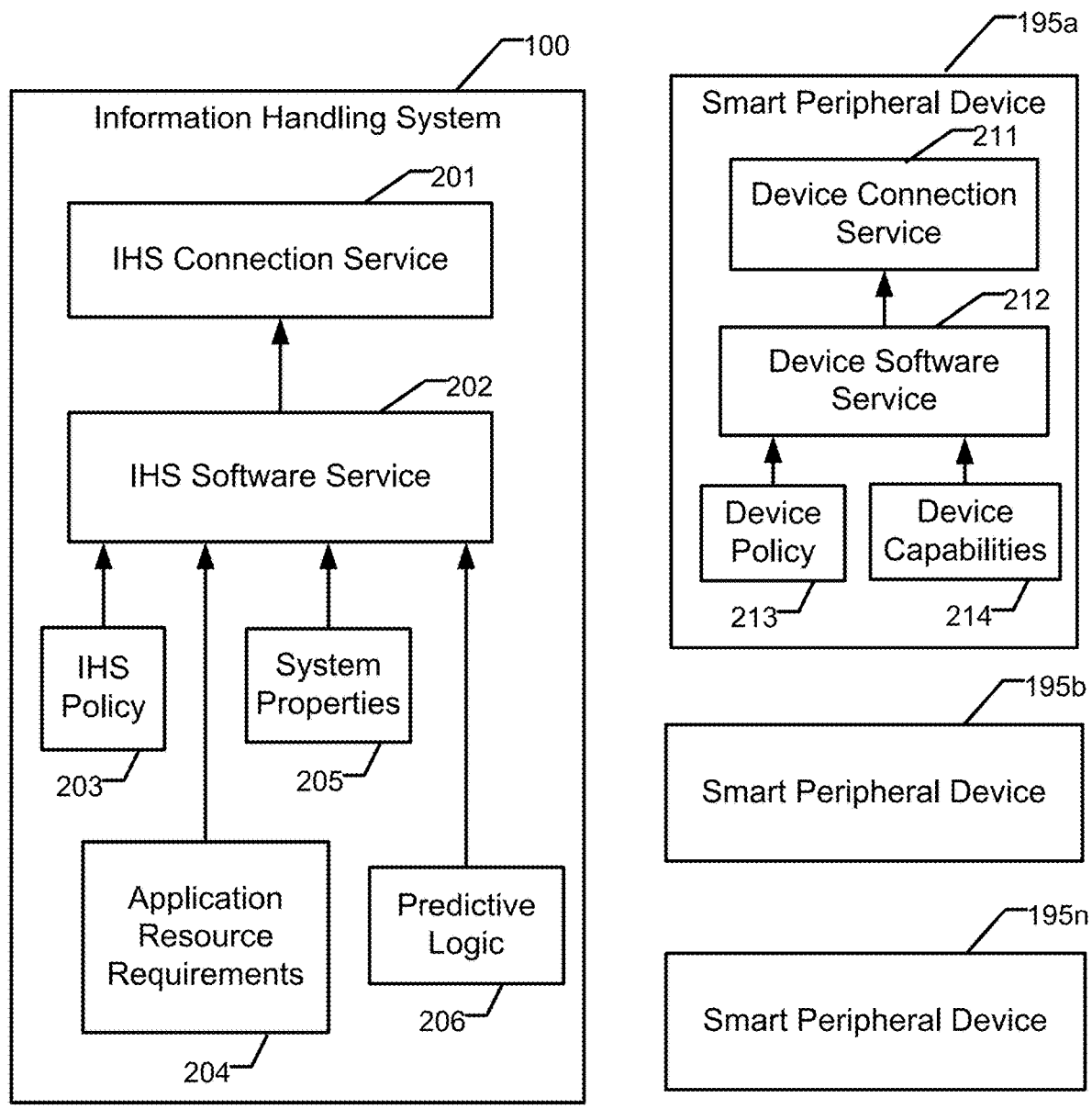
FIG. 2 is a block diagram illustrating an information handling system and one or more smart peripheral devices, according to a specific embodiment of the present disclosure.

FIG. 2 shows information handling system 100 and one or more smart peripheral devices 195*a-n* according to a specific embodiment of the present disclosure. Information handling system 100 can include additional hardware and/or software subsystems including a system connection service 201, a system software service 202, a system policy 203, application resource requirements 204, system properties 205, and predictive logic 206. Smart peripheral device 195*a* includes a device connection service 211, a device software service 212, a device policy 213, and device capabilities 214. Device capabilities 214 can include functionality included at smart peripheral device 195*a* or can include functionality provided by other devices coupled to device 195*a*, not shown at FIG. 2. FIG. 2 illustrates additional instances of smart peripheral device 195, labeled 195*b* and 195*n*. The capabilities of devices 195*a*, 195*b*, and 195*n* may differ. In particular, some instances of smart peripheral device 195 may provide capabilities needed by information handling system 100, while other instances of device 195 may not provide the needed capabilities. The techniques disclosed herein facilitate discovery of available smart peripheral devices and the functional capabilities of each of the available devices, and a means to connect to one of the available devices that includes capabilities desired by system 100. When information handling system 100 is connected to a selected smart peripheral device 195, system 100 can utilize functionality provided by the selected peripheral device.

Connection to a selected device 195 is via system connection service 201 at information handling system 100 and device connection service 211 at the selected smart peripheral device.

System software service 202 is configured to detect user and system needs based on current usage, expected near term usage such as derived from a calendar application, historical usage trends, and the like. For example, service 202 can identify whether a user may need access to a particular communication network. In addition, system software service 202 is responsible for receiving notifications from one or more smart peripheral devices 195, the notifications identifying one or more capabilities that can be provided by each of the available devices 195. System software service 202 is further configured to initiate a connect to an instance of peripheral device 195 that provides the required capabilities using system connection service 201. System software service 202 can be a program launched under control of a primary OS, a service OS, by BIOS 172, and the like.

System software service 202 can utilize information provided by policy 203, application resource requirements 204, system properties 205, predictive logic 206, or other resources available at information handling system 100. System software service 202 may operate autonomously, for example establishing a connection between system 100 and smart peripheral device 195 without intervention by a user of system 100. System policy 203 is configured to define which usage information is utilized and how the information is utilized to determine the present needs of a user of information handling system 100. For example, policy 203 can define how information provided by subsystems 204, 205, and 206 is utilized. Policy 203 may further define a user's access privileges, required security protocols, rules concerning sharing of a peripheral device with users at other information handling systems, and the like. System properties 205 can include information identifying attributes and configuration of system 100 and included components. For example, properties 205 can identify available I/O and network interfaces, supported display resolutions, support for multiple display devices, and other properties of system 100 that can influence the capabilities required of a smart peripheral device.

Application resource requirements 204 can include a lookup table specifying which peripheral devices are needed to support operation of particular application programs, and required attributes of those devices. Requirements 204 can further identify which software applications are presently executing at system 100, including applications that may be in a standby or hibernating state. For example, requirements 204 can specify that a high-resolution display device is needed if a particular computer-aided design program is running at system 100. Predictive logic 206 is configured to predict how system 100 may be utilized at a particular time. For example, a calendar application may indicate that a user of system 100 has reserved a conference room to deliver a presentation, and predictive logic 206 can identify the need to attach system 100 to a video projector device available at the conference room based on the calendar item. Subsystems 203-206 are merely examples of information that can be utilized by software service 202 to identify desired capabilities of a smart peripheral device. One of skill will appreciate that service 202 can utilize other information to identify required capabilities of a potential peripheral device. For example, software service 202 may prompt a user of system 100 to provide additional information regarding the desired capabilities of a peripheral device.

Each instance of smart peripheral device 195, such as devices 195a, 195b, and 195n, includes peripheral software service 212. Peripheral software service 212 is configured to detect and enumerate capabilities of the corresponding peripheral device, and wirelessly advertise the capabilities to information handling systems that are within a suitable range of peripheral device 195. The capabilities, stored at device capabilities 214, can include applicable performance attributes of device 195 and the identity and/or performance of other devices attached to device 195. Peripheral software service 212 can identify and update the enumerated capabilities when peripheral device 195 is initialized, after disconnecting from an information handling system, when an attached device is added or removed, or periodically. Device policy 213 includes information and settings governing how peripheral device 195 operates, such as whether device 195 can connect to more than one information handling system simultaneously, authorization and accessibility requirements, and the like. As used herein, the term advertise is used to represent wirelessly communicating availability and capabilities of a smart peripheral device to information handling systems that are within range of the smart device, including broadcasting, in response to a request by the information handling system, or via a suitable peer to peer protocol.

Figure 3:
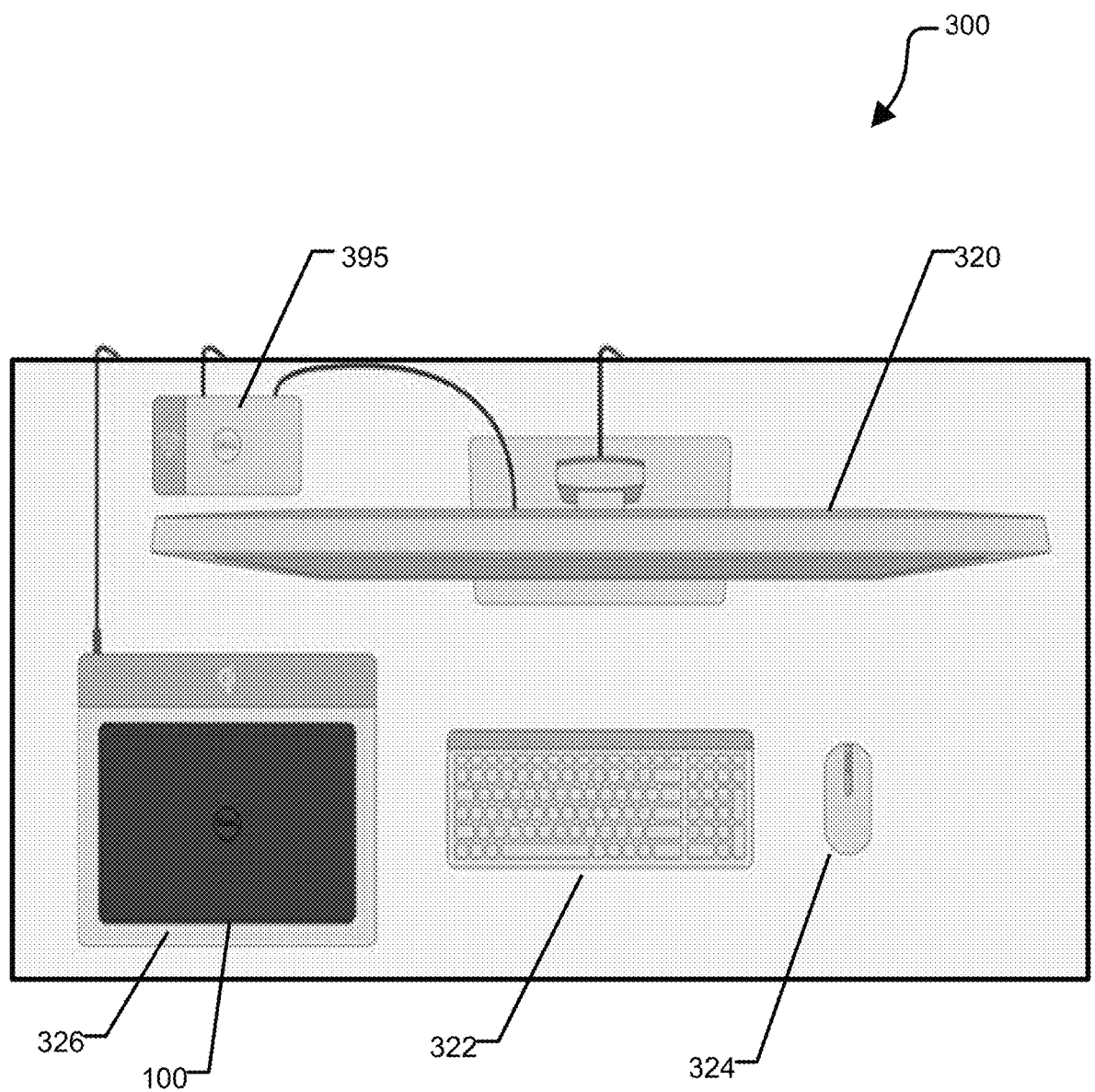
FIG. 3 is a perspective view of an information handling system workplace according to a specific embodiment of the present disclosure.

FIG. 3 shows a typical information handling system workplace 300 according to a specific embodiment of the present disclosure. Workplace 300 includes a wireless docking station 395 that is functionally coupled to additional devices including a display device 320, a keyboard 322, a pointing device (mouse) 324, and a wireless charging pad 326. Docking station 395 represents a smart peripheral device that includes a device connection service 212 that is configured to advertise capabilities of docking station 395 to an information handling systems that are within range of device 195, such as information handling system 100 shown here ready to receive power from charging pad 326. In the present example, the capabilities of docking station 395 include display 320, keyboard 322, mouse 324, and charging pad 326. The capabilities can further include attributes of the attached devices as well as attributes of the docking station itself. For example, the capabilities advertised by device connection service 212 can include a pixel resolution of display 320, a charging current provided by pad 326, quality of service of an integrated network interface, and the like.

During operation, device software service 212 wirelessly transmits the capabilities of docking station 395 to information handling system 100. As described above, software service 202 that is executing at system 100 is configured to evaluate the present needs of system 100. If service 202 determines that the capabilities of docking station 395 satisfy the needs of system 100, system 100 can decide to connect to docking station 395. If however software service 202 determines that the capabilities of docking station 395 do not satisfy the needs of system 100, software service 202 can elect not to connect to docking station 395 and instead connect to another docking station that does provide all of the needed capabilities.

Figure 4:
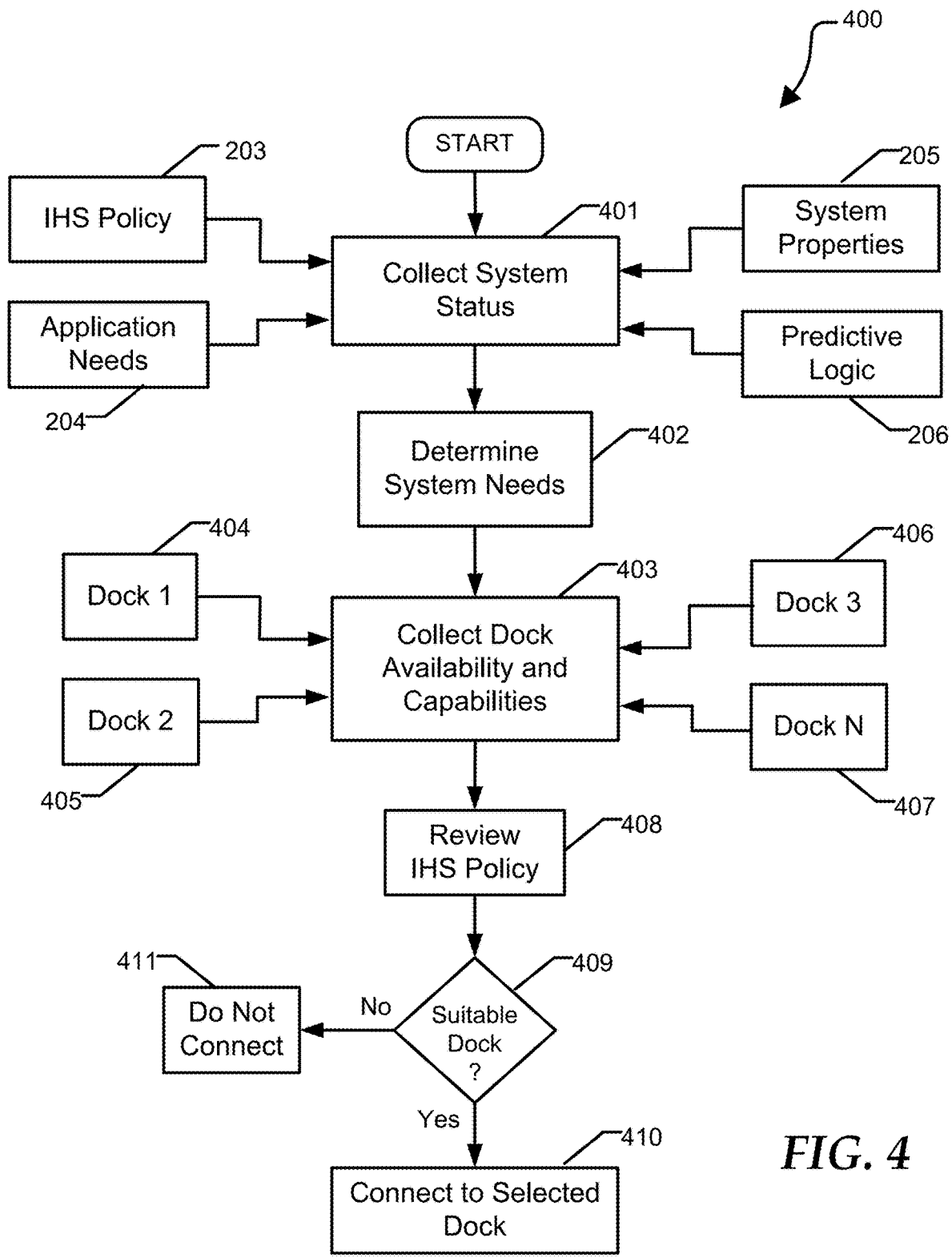
FIG. 4 is a flow diagram illustrating operation of a software service at an information handling system according to a specific embodiment of the present disclosure.

FIG. 4 shows a method 400 illustrating operation of system software service 202 according to a specific embodiment of the present disclosure. Method 400 shows how information handling system 100 can selectively connect to a particular docking station that provides needed capabilities. Method 400 starts at block 401 where information is collected from system policy 203, application needs 204, system properties 205, and predictive logic 206, as described at FIG. 2. At block 402, the status information is parsed to generate a list of desired capabilities of a docking station. At block 403, system software service 202 collects dock capability information from each docking station that is available and is within range of system 100; including in the present example docking stations 404, 405, 406, and 407. At block 408, software service 202 evaluates the information received from each docking station in light of conditions and requirements specified by system policy 203. At decision block 409, if one of the docking stations satisfies the needs of information handling system 100, system software service 202 can initiate a connection to the selected dock, as shown at block 410. If no docking station provides the needed capabilities, no connection is initiated, as shown at block 411.

Figure 5:
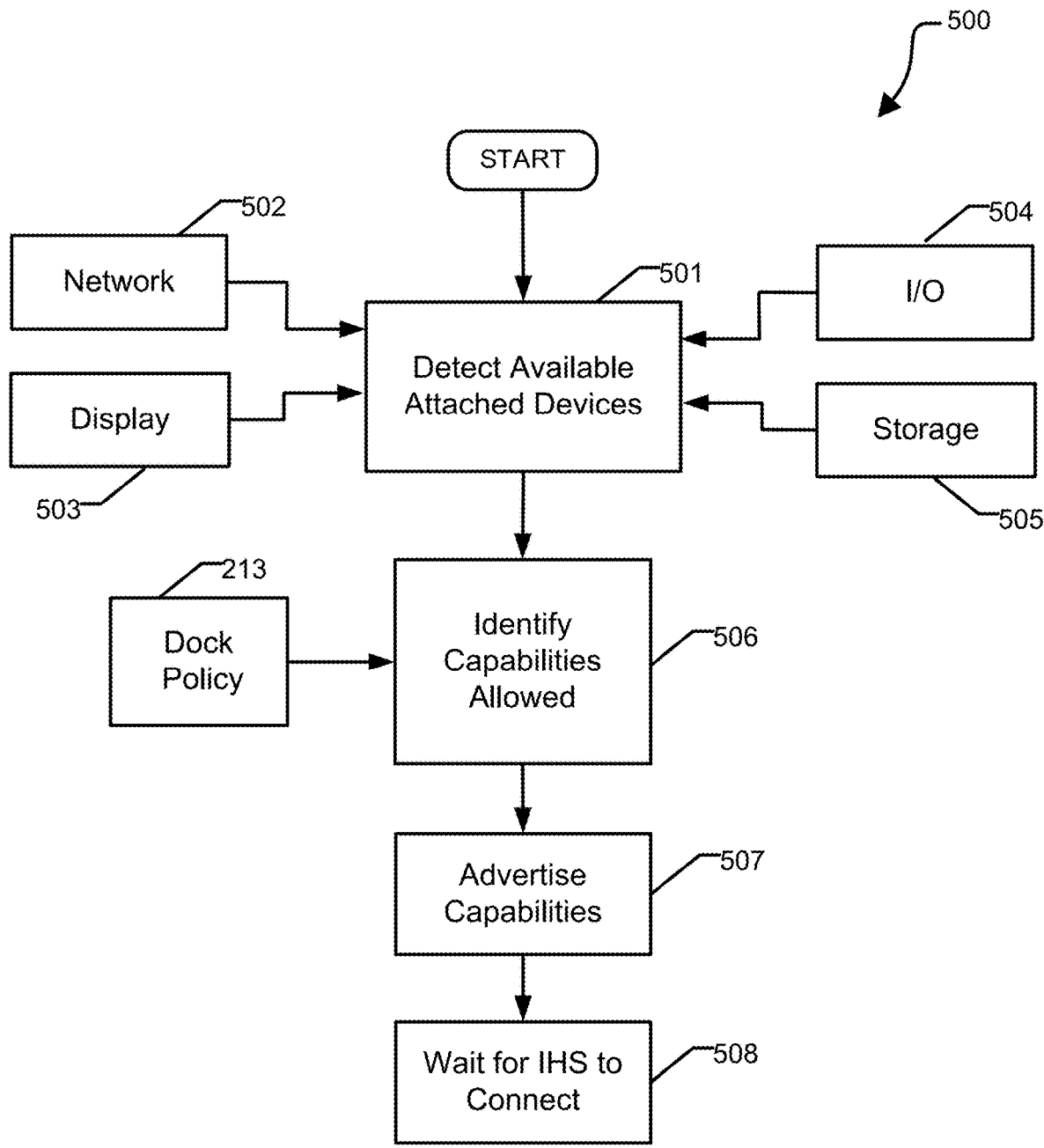
FIG. 5 is a flow diagram illustrating operation of a software service at a smart peripheral device according to a specific embodiment of the present disclosure.

FIG. 5 shows a method 500 illustrating operation of device software service 212 according to a specific embodiment of the present disclosure. Method 500 shows how a smart peripheral device, in this case a docking station, can enumerate its capabilities and advertise those capabilities to any information handling system that is in range to receive the wireless broadcast. Method 500 starts at block 501 where device software service 212 identifies capabilities of the docking station and of any attached devices, such as a communication network 502, a display device 503, one or more I/O devices 504, a data storage device 505, and the like. At block 506, dock policy 213 is evaluated to identify further restrictions or operating guidelines. At block 507, the docking station advertises available capabilities to information handling systems that are within range. Method 500 completes at block 508 where the docking station receives a connection request from an information handling system, the information handling system having determined that the advertised capabilities are sufficient, as determined by method 400.

Figure 6:
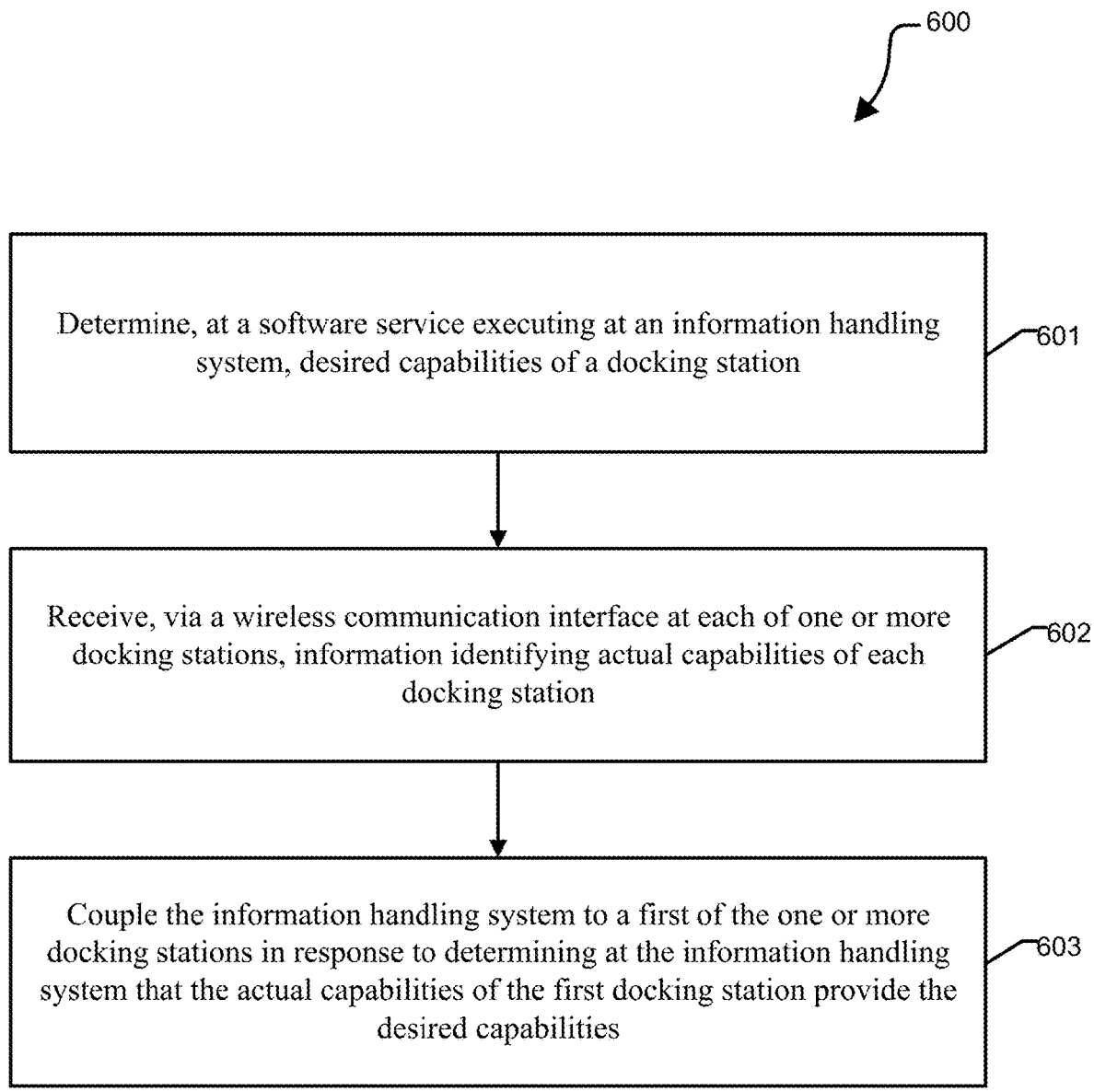
FIG. 6 is a flow diagram illustrating a method for selectively connecting an information handling system to a docking station according to a specific embodiment of the present disclosure.

FIG. 6 shows a method 600 for connecting an information handling system to a docking station according to a specific embodiment of the present disclosure. Method 600 begins at block 601 where a software service executing at an information handling system determines desired capabilities of a docking station. For example, software service 202 at information handling system 100 may utilize policy 203 and one or more techniques described above with reference to FIGS. 2-5. Method 600 continues at block 602 where information identifying actual capabilities of each of one or more docking station is received via a wireless communication interface at each docking stations. For example, one or more docking stations can each include a software service 212 to collect and advertise available capabilities of the corresponding docking station to information handling systems in the area. Method 600 completes at block 603 where the information handling system can couple to a particular docking station in response to determining at the information handling system that the actual capabilities of that docking station provide the desired capabilities as determined at block 601.

Figure 7:
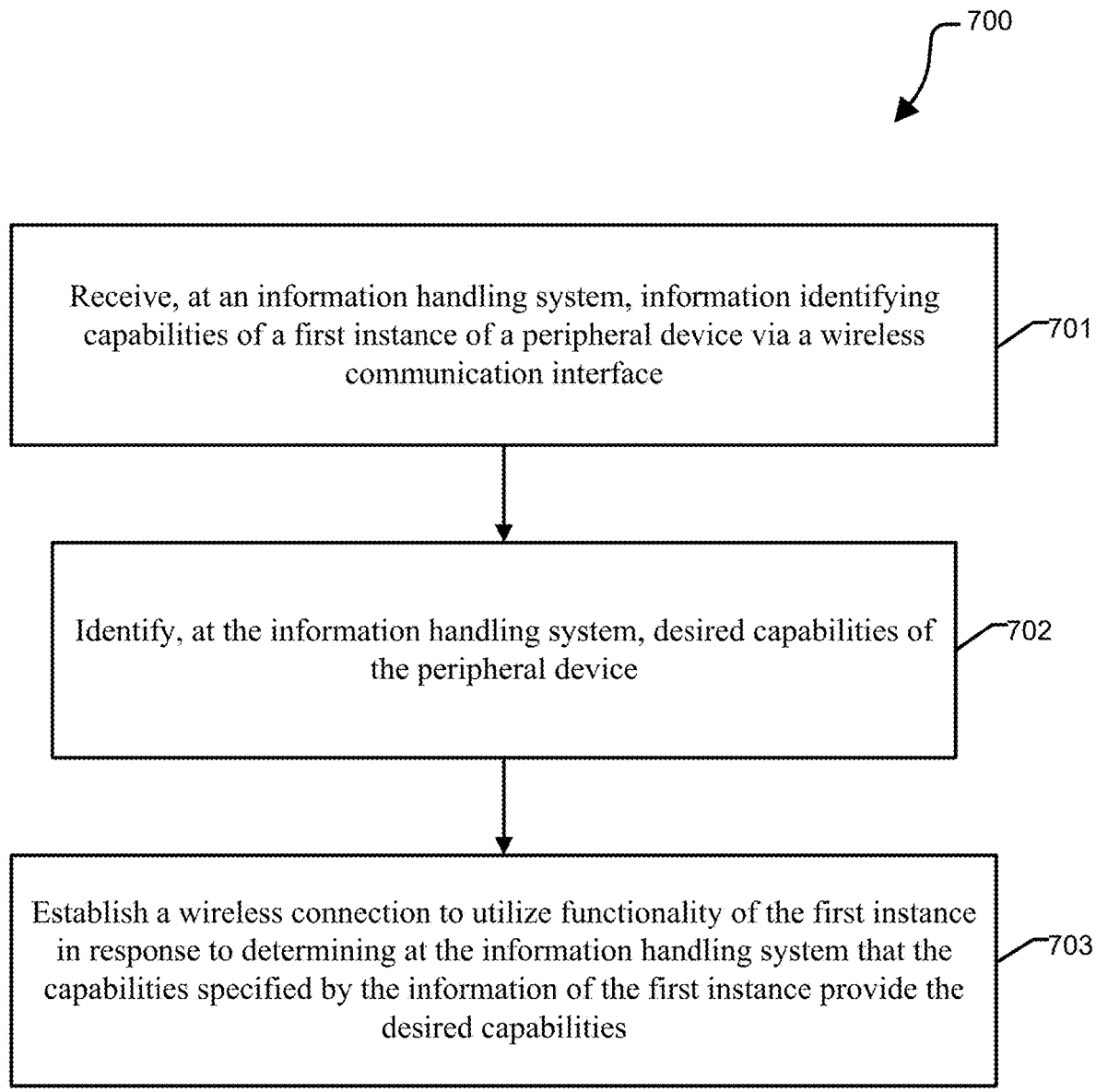
FIG. 7 is a flow diagram illustrating a method for selectively connecting an information handling system to a smart peripheral device according to a specific embodiment of the present disclosure.

FIG. 7 shows a method 600 for connecting an information handling system to a smart peripheral device according to a specific embodiment of the present disclosure. Method 700 begins at block 701 where information identifying capabilities of a first instance of a peripheral device is received at an information handling system via a wireless communication interface. At block 702, the information handling system identifies desired capabilities of the peripheral device. Method 700 completes at block 703 where a wireless connection is established to utilize functionality of the first instance in response to determining at the information handling system that the capabilities of the first instance provide the desired capabilities.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a software service to determine system needs of the information handling system and identify desired functional capabilities of a first docking station and a second docking station of one or more docking stations based on the system needs of the information handling system, the software service is further configured to collect information advertised by the one or more docking stations;
   a wireless communication interface to receive the information advertised identifying availability and actual functional capabilities of each of the one or more docking stations and attached devices to the each one of the one or more docking stations; and
   a wireless data interface to initiate a first connection request and functionally couple the information handling system to the first docking station in response to determining that particular actual functional capabilities of the first docking station and a first set of attached devices to the first docking station, provide the desired functional capabilities, the wireless data interface to elect not to initiate a second connection request and not to functionally couple to the second docking station in response to determining that other actual functional capabilities of the second docking station and a second set of attached devices to the second docking station do not provide the desired functional capabilities.

2. The information handling system of claim 1, wherein the desired functional capabilities include a network interface having a specified minimum bandwidth.

3. The information handling system of claim 1, wherein the desired functional capabilities include a network interface providing a specified minimum security characteristic.

4. The information handling system of claim 1, wherein the desired functional capabilities include a data storage device.

5. The information handling system of claim 1, wherein the wireless data interface is to functionally couple the information handling system to the first docking station based on information included at a policy file stored at the information handling system.

6. The information handling system of claim 1, wherein the desired functional capabilities are determined based on current applications executing at the information handling system.

7. The information handling system of claim 1, wherein the desired functional capabilities are determined based on one or more applications predicted to be executed at the information handling system.

8. The information handling system of claim 1, wherein the each of the one or more docking stations includes a particular software service to determine, and wirelessly advertise, the actual functional capabilities of the each docking station to information handling systems within transmission range of the docking station.

9. A method comprising:
   determining, at a software service executing at an information handling system, system needs and desired functional capabilities of the information handling system;
   receiving, via a wireless communication interface at each of the one or more docking stations, information identifying actual functional capabilities of each docking station and attached devices to the each of the one or more docking stations;
   initiating a first connection request and functionally coupling the information handling system to the first docking station of the one or more docking stations in response to determining at the information handling system that particular actual functional capabilities of the first docking station and a first set of the attached devices to the first docking station provide the desired functional capabilities; and
   electing not to initiate a second connection request and not to couple the information handling system to the second docking station of the one or more docking stations in response to determining that other actual functional capabilities of the second docking station and a second set of attached devices to the second docking station do not provide the desired functional capabilities.

10. The method of claim 9, wherein the desired functional capabilities include a network interface having a specified minimum bandwidth or security characteristic.

11. The method of claim 9, wherein the desired functional capabilities include a printer.

12. The method of claim 9, wherein the desired functional capabilities include a keyboard.

13. The method of claim 9, wherein the desired functional capabilities include a data storage device.

14. The method of claim 9, wherein the coupling of the information handling system to the first docking station is based on information included at a policy file stored at the information handling system.

15. The method of claim 9, wherein the desired functional capabilities are determined based on one or more applications currently executing at the information handling system or based on one or more applications predicted to be executed at the information handling system.

16. The method of claim 9, wherein each of the one or more docking stations includes a particular software service to determine and wirelessly advertise the actual functional capabilities of the docking station to information handling systems that are within transmission range of the docking station.

17. A method comprising:
   collecting, by a software service, information advertised from docking stations associated with an information handling system;
   receiving, at the information handling system via a wireless communication interface, the information which identifies availability and actual functional capabilities of a first peripheral device and a second peripheral device, wherein the first peripheral device is associated with a first docking station of the docking stations and the second peripheral device is associated with a second docking station of the docking stations;
   determining system needs of the information handling system and identifying desired functional capabilities based on the system needs;
   establishing a first wireless connection between the information handling system and the first docking station to utilize functionality of the first peripheral device, the establishing of the first wireless connection is in response to determining that the actual functional capabilities of the first peripheral device provide the desired functional capabilities; and
   electing not to establish a second wireless connection between the information handling system and the second docking station, the electing not to establish the second wireless connection is in response to determining that the actual functional capabilities of the second peripheral device do not provide the desired functional capabilities.

18. The method of claim 17, wherein the desired functional capabilities are determined based on one or more applications currently executing at the information handling system or based on one or more applications predicted to be executed at the information handling system.

19. The method of claim 17, wherein the first peripheral device and the second peripheral device each includes a software service to determine and wirelessly advertise actual functional capabilities of the first peripheral device and the second peripheral device to information handling systems that are within communicative range of the first docking station and the second docking station respectively.

20. The method of claim 17, wherein the identifying of the desired functional capabilities is based on policy information stored at the information handling system.

\* \* \* \* \*